3,773,836
INDANONE DERIVATIVES AND PROCESSES
FOR PRODUCING SAME
John B. Hall, Oakhurst, N.J., assignor to International
Flavors & Fragrances Inc., New York, N.Y.
No Drawing. Filed Aug. 18, 1969, Ser. No. 851,049
Int. Cl. C07c 49/54
U.S. Cl. 260—586 R                                4 Claims

ABSTRACT OF THE DISCLOSURE

Indanone derivatives having the formula

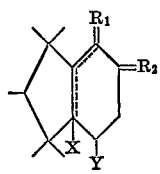

wherein one of $R_1$ and $R_2$ is O and the other is $H_2$; Y is H or, taken together with X, an epoxy oxygen; one of the single dashed lines represents a double bond, which is present unless said epoxy oxygen is present, and when $R_2$ is O and the double bond is conjugated with $R_2$, X is H; perfume compositions containing such indanones and processes for producing same.

BACKGROUND OF THE INVENTION

There is a continuing need for fragrance materials having persistent musk woody odors with satisfactory overtones or qualities. While many natural products have musk and/or woody fragrances, the more desirable of these are not only frequently in short supply and hence difficult to obtain and expensive, but the combination of the olfactory qualities is rare. Moreover, it is also most desirable that such musk woody fragrance character have good persistence so that the substances can be used in quality formulations for perfume or other olfactory compositions. Such materials should also possess good blending qualities so that they are useful in preparing perfume compositions.

THE INVENTION

Briefly, the present invention provides novel indanones having the structural formula:

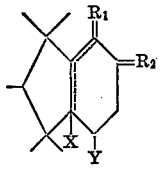

wherein one of $R_1$ and $R_2$ is O and the other is $H_2$. It will be observed that these compositions also include the 7,7α-epoxy derivative, and the foregoing formula encompasses such monounsaturated and saturated epoxy indanones. Accordingly, Y is H or, taken together with X, an epoxy oxygen, and one of the single dashed lines represents the double bond unless said epoxy oxygen is present. When the double bond is conjugated with $R_2$ (when this latter is O), then X is H.

These substances have strong, persistent, musk woody odors with various rich amber, precious woody, or fine woody overtones. Thus, the present invention also provides novel perfume and fragrance compositions containing such indanones, and processes for producing such indanones are also disclosed herein.

More specifically, the indanone derivatives contemplated herein are 6,7-dihydro-1,1,2,3,3-pentamethyl-4(5H)-indanone having the formula:

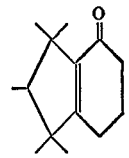

6,7-dihydro-1,1,2,3,3-pentamethyl-5(4H)-indanone having the formula

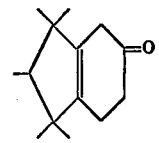

7,7a-dihydro-1,1,2,3,3-pentamethyl-5(6H)-indanone having the formula

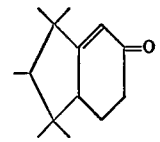

and 7,7a - epoxy-5,6,7,7a-tetrahydro-1,1,2,3,3-pentamethyl-4(3aH)-indanone having the formula:

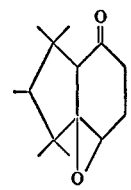

It will be appreciated by those skilled in the art from the present disclosure that the materials according to this invention can exist in several stereoisomeric forms. It is contemplated that the formulas given herein include the several isomeric forms.

A convenient starting material according to the present invention is pentamethylindane. The pentamethylindane is hydrogenated to provide the tetrahydro derivative as the first step in the synthesis of the 4-indanones. The six-membered ring is then oxidized with a suitable agent to obtain a mixture of the monounsaturated indanone and the epoxy indanone. The hydrogenation is carried out under controlled conditions to add two moles of hydrogen to each mole of the indane. It is preferred to use metallic catalysts such as Raney nickel or noble metals such as palladium, rhodium, and the like.

The hydrogenation is carried out at substantially super-atmospheric pressures of from 50 to 200 atmospheres, and is preferably carried out at from 60 to about 130 atmospheres. The reaction is desirably carried out at temperatures in excess of 100° C. up to 225° C., and a preferred temperature range is 150° to 190° C.

The 4,5,6,7-tetrahydropentamethylindane so obtained is then oxidized to provide the substituent or substituents on the six-membered ring. The oxidation is carried out with an oxidizer such as a hexavalent chromium compound, selenium dioxide, and the like. In preferred embodiments of the process, chromium trioxide or alkali metal dichromate such as sodium dichromate, potassium dichromate, and the like are used.

This reaction can be carried out at pressures above or below atmospheric, but atmospheric pressure is desired to minimize ebullition of any reaction vehicle and provide an acceptable reaction rate, while maintaining control over the reaction. The temperatures used are in the range of 20° to 70° C., and are preferably in the range of from 40° to 60° C.

The reaction is preferably carried out in the presence of a vehicle, and acidic vehicles are desirable. Such reaction vehicles include lower alkanoic acids having up to 3 or 4 carbon atoms, and acetic acid is a preferred vehicle.

The 5-indanone can be prepared by producing the 5-indanol (a phenol) and hydrogenating it to obtain the 4,5,6,7-tetrahydro derivative or by reducing the phenol or its lower alkyl ether by means of a Birch reduction. The 5-indanol is produced by treatment of 1,1,2,3,3-pentamethylindane with an acyl halide such as acetyl chloride in the presence of a Friedel-Crafts catalyst to provide the indanyl-lower alkyl ketone. The ketone is then oxidized to the corresponding ester with a percarboxylic acid such as peracetic acid, and the indanol is obtained therefrom by hydrolysis with a strong alkali such as potassium hydroxide.

The indanol is treated with sodium hydride or another alkali metal hydride in a reaction vehicle, preferably a solvent such as dimethyl formamide to form the alkali metal alcoholate. This reaction can be carried out at temperatures of 25° C. to 70° C., preferably from 40° to 55° C. The ether is then produced by treatment of the alcoholate with a lower dialkyl sulfate such as dimethylsulfate.

The 5-indanyl ether is reduced according to the Birch technique to obtain a ketone mixture. The Birch reduction is carried out with an alkali metal, preferably lithium, in liquid or gaseous ammonia. This reaction is carried out at from −40° C. to 30° C. The pressure at which this reaction is carried out ranges from atmospheric or slightly subatmospheric up to about five atmospheres. Thus, at −33° C. the reaction can be carried out at one atmosphere in liquid ammonia, while at 20–25° C. the reaction is carried out at five atmospheres.

The ketones produced according to the above reaction schemes can be separated from the vehicle and any unreacted materials or unwanted by-products removed by conventional means including washing, distillation, crystallization, extraction, preparative chromatography, and the like. It is preferred to fractionally distill the washed reaction product under a relatively high vacuum so as to obtain a relatively pure mixture of unsaturated ketones. Product purities of 80% are readily obtained, and much higher purities can also be provided by suitable treatment. The individual ketones can also be obtained by similar techniques. All parts, proportions, percentages and ratios herein are by weight, unless otherwise indicated.

The pentamethylindanones and epoxides of this invention are useful as fragrances. They can be used singly or in combination to contribute a woody musk fragrance. As olfactory agents the indanones of this invention may be formulated into or used as components of a "perfume composition."

The term "perfume composition" is used herein to mean a mixture of organic compounds, including, for example, alcohols, aldehydes, ketones, esters and frequently hydrocarbons which are admixed so that the combined odors of the individual components produce a pleasant or desired fragrance. Such perfume compositions usually contain: (a) the main note or the "bouquet" or foundation-stone of the compositions; (b) modifiers which round-off and accompany the main note; (c) fixatives which include odorous substances which lend a particular note to the perfume throughout all stages of evaporation, and substances which retard evaporation; and (d) top-notes which are usually low-boiling fresh-smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by highlighting or moderating the olfactory reaction contributed by another ingredient in the composition.

The amount of the compounds of this invention which will be effective in perfume compositions depends on many factors, including the other ingredients, their amounts and the effects which are desired. It has been found that perfume compositions containing as little as 2% by weight of mixtures or compounds of this invention, or even less, may be used to impart a woody musk odor to soaps, cosmetics, and other products. The amount employed can range up to 7% or higher and will depend on considerations of cost, nature of the end product, the effect desired on the finished product, and the particular fragrance sought.

The partially saturated and epoxy indanones of this invention can be used alone or in a perfume composition as olfactory components in detergents and soaps; space deodorants; perfumes; colognes; bath preparations such as bath oil, bath salts; hair preparations such as lacquers, brilliantines, pomades, and shampoos; cosmetic preparations such as creams, deodorants, hand lotions, sun screens; powders such as talcs, duting powders, face powder, and the like. When used as an olfactory component of a perfumed article, as little as 0.011% of one or more of the novel ketones will suffice to impart a fine woody musk odor.

In addition, the perfume composition can contain a vehicle or carrier for the other ingredients. The vehicle can be a liquid such as alcohol, glycol, or the like. The carrier can be an absorbent solid such as a gum or components for encapsulating the composition.

It will also be appreciated that the pentamethylindanone derivatives according to this invention can be used to enhance, alter, modify, or supplement the fragrance properties of natural or synthetic fragrance compositions. Thus, such indanones can be used in fragrance compositions for addition to perfume compositions or directly to products such as soap, detergents, cosmetics, and the like. The fragrance compositions so prepared do not entirely provide the olfactory properties to the finished perfume or other article, but they do furnish a substantial part of the overall fragrance impression.

The following examples are given to illustrate embodiments of the invention as it is presently preferred to practice it. It will be understood that these examples are illustrative, and the invention is not to be considered as restricted thereto except as indicated in the appended claims.

EXAMPLE I (a) preparation of 4,5,6,7-tetrahydro-1,1,2,3,3-pentamethylindane

The following ingredients are charged into a stainless steel five-liter autoclave equipped with a hydrogen gas feed:

1,800 grams (8.14 moles) of 1,1,2,3,3-pentamethylindane (85% pure)
90 grams of Raney nickel.

Enough hydrogen is fed into the autoclave to raise the pressure to 1,000 p.s.i.g. The hydrogen feed is then continued and the autoclave is heated to a temperature in the range of 150–185° C. over a period of about 8 hours until an amount of hydrogen equal to 10% in excess of theory is absorbed. During this time the pressure in the autoclave is maintained at 1,500 p.s.i.g.

The 1,641 grams of crude product removed from the autoclave is distilled on a 12-inch Goodloe column after being mixed with 10.0 grams of Primol mineral oil. The distillate is recovered in two fractions:

Fraction I: Distills at a temperature of 80° C. and 4.0 mm. Hg to provide 401 grams of 4,5,6,7-tetrahydro-1,1,2,3,3-pentamethylindane.

Fraction II: Distills at a temperature of 86–88° C. and 3.5–3.8 mm. Hg to provide 729 grams of hexahydro-1,1,2,3,3-pentamethylindane.

A sample of Fraction I is further refined on a six-foot by ¾-inch gas liquid chromatographic (GLC) column containing 20% Carbowax polyethylene glycol and operated at 110° C. Analysis by infrared (IR) and proton magnetic resonance (PMR) confirms and the structure:

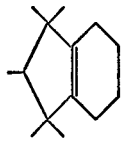

(b) Production of 6,7 - dihydro-1,1,2,3,3-pentamethyl-4 (5H)-indanone and 7,7a-epoxy-5,6,7,7a-tetrahydro-1,1,2,3,3-pentamethyl-4(3aH)-indanone Into a 2-liter round-bottom flask equipped with thermometer, stirrer, heating mantle and reflux condenser is placed 194 g. of the tetrahydropentamethylindane produced by the foregoing procedure. The contents of the flask are heated to 50° C. and a solution of 298 grams of sodium bichromate ($Na_2Cr_2O_7 \cdot 2H_2O$) in 1200 ml. of acetic acid is added during two hours while the temperature is maintained at 50° C. After addition is complete, the reaction mass is heated to 100° C. and maintained at that temperature for five hours.

The reaction mass is then cooled to 25° C., and 500 ml. of toluene and 2 liters of water are added. The mixture is stirred for 15 minutes and the aqueous phase is then separated from the organic phase. The aqueous phase is extracted with one 500 ml. volume of toluene and the toluene extract is then combined with the original organic phase. The combined organic material is washed successively with an equal volume of water, an equal volume of saturated aqueous sodium bicarbonate, and an equal volume of water.

The solvent is stripped off the washed material to yield a crude product weighing 198 grams. This crude product is distilled at a vapor temperature of from 93° C.–106° C. and 3.0 mm. Hg yielding a product weighing 86.0 grams. This vacuum-distilled product is redistilled on a 12-inch Seavy column at a vapor temperature of 75° C.–89° C. and 2.4 mm. Hg. A sample of the redistilled material is separated into pure components on an eight-foot by ⅜-inch GLC column at 160° C. using 10% Carbowax polyethylene glycol on Chromosorb activated earth.

The pure materials are analyzed by IR spectroscopy to confirm the structures of the products:

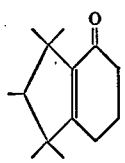 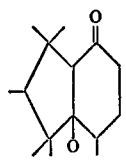

The monounsaturated indanone has a very sweet musk, precious woody odor. When incorporated in soap and detergent over a three-month period in quantities up to 0.1%, the odor imparted by this indanone remains strong and pleasant, and there is no discoloration of the soap during this time.

The epoxyindanone has a sweet, rich musk and amber odor with a fine, strong dry out. The ratio of the monounsaturated indanone to the epoxyindanone using the process of this Example is 4:1.

NMR SPECTRUM OF THE TETRAHYDRO-4-INDANONE

| Peak | Interpretation |
|---|---|
| Multiplet at 2.17 p.p.m. | 4-methylene protons (adjacent). |
| Singlets at 1.18, 1.04, 0.98 and 0.92 p.p.m. | 4-methyl protons of gem dimethyls. |
| Doublet at 0.87 p.p.m. (J=7CPS) | $-CH_2-\overset{\overset{\displaystyle O}{\|}}{C}-$ |
| Diffuse quartet at 1.55 p.p.m. | Methine proton. |
| Multiplet at 1.80–2.00 p.p.m. | Methylene proton. |

INFRARED ANALYSIS OF THE TETRAHYDRO-4-INDANONE

| Peak (microns) | Interpretation |
|---|---|
| 6.02 | Conjugated carbonyl. |
| 6.17 | Conjugated carbon-to-carbon double bond. |
| 7.22 and 7.36 | Gem-dimethyl groups. |
| 7.27 | Isolated methyl group. |

EXAMPLE II (a) Production of 5-methoxy-1,1,2,3,3-pentamethylindane

Into a 100 ml. reaction flask equipped with cooling coils, stirrer, thermometer, and reflux condenser are introduced 2.7 grams sodium hydride (52.5%) and 20.0 grams dimethyl formamide. While stirring the flask contents 12.0 grams of 1,1,2,3,3-pentamethyl-5-indanol and 20.0 grams of dimethyl formamide are added during one hour with sufficient cooling so that the temperature does not rise above 50° C. and the reaction mixture is stirred to complete the evolution of hydrogen. Dimethyl sulfate (7.6 g.) is added to the reaction mixture and the temperature is maintained at 50° C.

Fifty milliliters of water and 10 ml. of toluene are added and the organic phase is separated from the aqueous phase. The aqueous phase is extracted with 10 ml. toluene and combined with the organic phase which is then washed once with 10 ml. of 5% aqueous HCl and twice with 10 ml. water. The solvent is stripped from the washed material to obtain 12.0 grams of crude oil layer. This crude oil layer is distilled to obtain a liquid having an $n_D^{20}$ of 1.5185. IR and PMR analysis confirm the structure of the purified compound to be 5-methoxy-1,1,2,3,3-pentamethylindane.

(b) Preparation of 6,7-dihydro-1,1,2,3,3-pentamethyl-5(4H)-indanone and 7,7a-dihydro-1,1,2,3,3-pentamethyl-5(6H)-indanone Into a one-liter flask equipped with thermometer, stirrer, and reflux condenser are introduced 750 ml. of liquid ammonia and 45 g. of one-inch pieces of lithium ribbon (added to the ammonia with vigorous stirring) at −33° C. Five grams of the methoxyindane and 65 g. of absolute ethanol are added during two hours. When addition is complete, the reaction mass is stirred for eight hours and the excess ammonia is permitted to evaporate.

The reaction mass is poured onto 500 grams of ice to yield an organic phase and an aqueous phase containing a precipitate. The precipitate is filtered from the aqueous phase and the aqueous phase is then extracted with chloroform. The chloroform extract is combined with the organic layer. The total organic phase is washed once with water, and the solvent is stripped off to provide a crude product weighing 4.0 g.

The crude product is placed in a mixture of 100 ml. of 3% oxalic acid and 30 ml. of ethyl acetate, and the crude mixture is refluxed for 15 minutes. The resulting material is cooled, and the aqueous phase separated from the organic phase. The aqueous phase is washed with methylene chloride, the washings are combined with the organic phase, and solvent is stripped from the organic phase.

The resulting material has a very fine and woody musk odor. IR and PMR analysis confirm the structures below to be present:

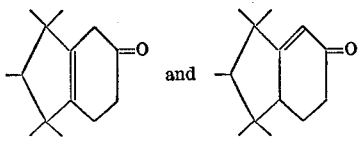

EXAMPLE III

Preparation of soap compositions

A total of 100 grams of soap chips (from a toilet soap prepared from tallow and coconut oil) is mixed with one gram of the perfume composition given below until a substantially homogeneous composition is obtained. The soap composition manifests a characteristic woody-amber musk-like odor.

The perfume composition comprises the following ingredients:

|  | Parts |
|---|---|
| Vetivert oil | 40 |
| Mixture of ketones produced in Example I | 60 |
| Sandalwood oil | 100 |
| Rose geranium oil | 200 |
| Musk extract (3%) | 25 |
| Civet extract (3%) | 25 |
| Benzyl iso-eugenol | 100 |
| Coumarin | 100 |
| Heliotropin | 50 |
| Bois de Rose oil | 200 |
| Benzoin resin | 100 |
|  | 1,000 |

Similar results are obtained when the mixture of Example I is replaced with the ketone mixture of Example II or the individual ketones of Examples I or II.

EXAMPLE IV

Preparation of a detergent composition

A total of 100 grams of a detergent powder is mixed with 0.15 gram of the perfume composition as set forth in Example III until a substantially homogeneous composition having a woody-amber or amber-musk like odor is obtained.

EXAMPLE V

Preparation of a cosmetic powder composition

A cosmetic powder is prepared by mixing 100 grams of talcum powder with 0.25 gram of the ketones obtained from the process of Example II in a ball mill. A second cosmetic powder is similarly prepared except that the mixture prepared in Example II is replaced by the tetrahydroindanone of Example I. Both cosmetic powders have desirable woody-amber musk-like odors.

EXAMPLE VI

Liquid detergent

Concentrated liquid detergents with a woody-amber musk-like odor are prepared containing 0.1%, 0.15%, and 0.20% of the mixture produced in Example II. They are prepared by adding and homogeneously mixing the appropriate quantity of the compound to Ultra Chemical Company's P-87 liquid detergent.

What is claimed is:

1. Indanone derivatives having the formula:

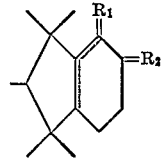

wherein one of $R_1$ and $R_2$ is O and the other is $H_2$ and one of the dashed lines is a double bond.

2. 6,7-dihydro-1,1,2,3,3-pentamethyl-4(5H)-indanone.
3. 6,7-dihydro-1,1,2,3,3-pentamethyl-5(4H)-indanone.
4. 7,7a-dihydro-1,1,2,3,3-pentamethyl-5(6H)-indanone.

References Cited

UNITED STATES PATENTS

| 2,439,513 | 4/1948 | Hamblet et al. | 260—586 B X |
| 2,992,272 | 7/1961 | Hay | 260—586 B X |
| 3,042,722 | 7/1962 | Jason et al. | 260—586 B |
| 3,404,185 | 10/1968 | Thomas et al. | 260—586 B |

OTHER REFERENCES

Kundu et al.: "Tetrahedron Letters," No. 14, pp. 627–9 (1962).

Von V. Prelog et al.: "Helvetica Chimica Acta," vol. 32, Fasciculus 7, pp. 2360–3, 1949.

Beilstein: "Organische Chemie," Band VI, Erstenteil, Sys. No. 620/H163, III Supp. 1946.

Brooks: "Chemistry of Nonbenzoid Hydrocarbons," pp. 317–8, 1950.

BERNARD HELFIN, Primary Examiner

N. MORGENSTERN, Assistant Examiner

U.S. Cl. X.R.

252—522; 260—348 C, 348.5 R, 488 B, 611 F, 586 B, 617 F, 666 PY